US009289747B2

(12) United States Patent
O'Gara et al.

(10) Patent No.: US 9,289,747 B2
(45) Date of Patent: Mar. 22, 2016

(54) NANOCOMPOSITES AND THEIR APPLICATION AS MONOLITH COLUMNS

(71) Applicant: Waters Technologies Corporation, Milford, MA (US)

(72) Inventors: John E. O'Gara, Ashland, MA (US); Julia Ding, Madison, WI (US); Daniel B. Walsh, Salem, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 14/275,250

(22) Filed: May 12, 2014

(65) Prior Publication Data

US 2014/0326649 A1    Nov. 6, 2014

Related U.S. Application Data

(62) Division of application No. 10/558,541, filed as application No. PCT/US2004/013721 on May 3, 2004, now abandoned.

(60) Provisional application No. 60/474,068, filed on May 28, 2003.

(51) Int. Cl.
| | | |
|---|---|---|
| B32B 5/16 | (2006.01) | |
| B01J 20/285 | (2006.01) | |
| B82Y 30/00 | (2011.01) | |
| C08G 77/20 | (2006.01) | |
| C08J 5/00 | (2006.01) | |
| B01D 15/20 | (2006.01) | |
| B01D 15/22 | (2006.01) | |
| B01J 20/26 | (2006.01) | |
| B05D 7/22 | (2006.01) | |

(52) U.S. Cl.
CPC .............. *B01J 20/285* (2013.01); *B01D 15/206* (2013.01); *B01D 15/22* (2013.01); *B01J 20/26* (2013.01); *B05D 7/22* (2013.01); *B82Y 30/00* (2013.01); *C08G 77/20* (2013.01); *C08J 5/005* (2013.01); *B01J 2220/82* (2013.01); *B01J 2220/86* (2013.01); *Y10T 428/26* (2015.01); *Y10T 428/31612* (2015.04); *Y10T 428/31663* (2015.04)

(58) Field of Classification Search
CPC ...... B01J 20/103; B01J 20/283; B01J 20/285; B01J 20/291
See application file for complete search history.

(56) References Cited

U.S. PATENT DOCUMENTS

| | | | |
|---|---|---|---|
| 5,650,474 A | 7/1997 | Yamaya et al. | |
| 5,895,794 A | 4/1999 | Berg et al. | |
| 6,136,187 A * | 10/2000 | Zare .................. | B01J 20/291 210/198.2 |
| 6,310,110 B1 | 10/2001 | Markowitz et al. | |
| 6,592,764 B1 | 7/2003 | Stucky et al. | |
| 6,680,013 B1 | 1/2004 | Stein et al. | |
| 6,696,258 B1 | 2/2004 | Wei et al. | |
| 6,875,348 B2 | 4/2005 | Zare et al. | |
| 6,884,346 B2 | 4/2005 | Zare et al. | |
| 6,952,436 B2 | 10/2005 | Wirnsberger et al. | |
| 7,375,168 B2 | 5/2008 | Zhang et al. | |
| 2001/0033931 A1 | 10/2001 | Jiang et al. | |
| 2002/0070168 A1 | 6/2002 | Jiang et al. | |
| 2003/0021730 A1 | 1/2003 | Muller et al. | |
| 2003/0150811 A1 | 8/2003 | Walter et al. | |
| 2003/0213732 A1 * | 11/2003 | Malik .................. | B01D 15/08 210/94 |
| 2004/0211730 A1 * | 10/2004 | Zhang .................. | B01J 20/103 210/656 |
| 2006/0093836 A1 * | 5/2006 | Huang .................. | B01J 20/285 428/447 |
| 2006/0113231 A1 * | 6/2006 | Malik .................. | B01J 20/103 210/198.2 |
| 2007/0062874 A1 * | 3/2007 | Malik .................. | B01D 15/206 210/656 |

* cited by examiner

*Primary Examiner* — Margaret Moore
(74) *Attorney, Agent, or Firm* — Locke Lord LLP; Nicholas J. DiCeglie, Jr.

(57) ABSTRACT

Novel materials for chromatographic separations, processes for their preparation, and separation devices containing the chromatographic materials. In particular, hybrid inorganic/organic monolith materials comprising a polymerized scaffolding nanocomposite (PSN), wherein the nanocomposite contains a scaffolding functionally capable of chemically interacting with a surface of a second material are described. The hybrid inorganic/organic materials have enhanced wall adhesion and increased resistance to shrinkage as compared to prior art monolith materials. The improved adhesion of the monoliths enable the preparation of capillary columns with an internal diameter (I.D.)$\geq$50 μm.

54 Claims, 4 Drawing Sheets

PSG Reaction: Condensation and Polymerization

NANOCOMPOSITES AND THEIR APPLICATION AS MONOLITH COLUMNS

RELATED APPLICATION

This application is a Divisional application of U.S. patent application Ser. No. 10/558,541, filed Feb. 15, 2007, and now abandoned, which application is the U.S. national phase, pursuant to 35 U.S.C. §371 of PCT/US2004/013721, filed May 3, 2004, which was published in English as WO2004/105910 A2 on Dec. 9, 2004 and which claims the benefit of U.S. provisional application Ser. No. 60/474,068, filed May 28, 2003, the disclosure of each of which application is incorporated in their entireties by this reference.

BACKGROUND OF THE INVENTION

Packing materials for liquid chromatography (LC) are generally classified into two types: organic materials, e.g., polydivinylbenzene; and inorganic materials typified by silica. Many organic materials are chemically stable against strongly alkaline and strongly acidic mobile phases, allowing flexibility in the choice of mobile phase pH. However, organic chromatographic materials generally result in columns with low efficiency, leading to inadequate separation performance, particularly with low molecular-weight analytes. Furthermore, many organic chromatographic materials shrink and swell when the composition of the mobile phase is changed. In addition, most organic chromatographic materials do not have the mechanical strength of typical chromatographic silicas.

Due in large part to these limitations, silica is the material most widely used in High Performance Liquid Chromatography (HPLC). The most common applications employ silica that has been surface-derivatized with an organic group such as octadecyl ($C_{18}$), octyl ($C_8$), phenyl, amino, cyano, etc. As stationary phases for HPLC, these packing materials result in columns that have high efficiency and do not show evidence of shrinking or swelling.

However, a further problem associated with silica particles and polymer particles is packed bed stability. Chromatography columns packed with spherical particles can be considered to be random close packed lattices in which the interstices between the particles form a continuous network from the column inlet to the column outlet. This network forms the interstitial volume of the packed bed, and acts as a conduit for fluid to flow through the packed column. In order to achieve maximum packed bed stability, the particles must be tightly packed, and hence, the interstitial volume is limited in the column. As a result, such tightly packed columns afford high column backpressures that are not desirable. Moreover, bed stability problems for these chromatography columns are still typically observed because of particle rearrangements.

A trend in current HPLC development is the miniaturization of column diameters that is driven by the often limited amount of samples originating from such areas as the life sciences. For mini- and microbore columns as well as capillary columns, the trade-off between particle size and backpressure becomes even more pronounced. For example, MacNair et al.[1] required specifically designed hardware that enabled an operating pressure as high as 500 MPa in order to achieve a HPLC separation of a tryptic digest in a 25 cm long capillary column packed with 1 μm silica particles. The pressure is one order of magnitude higher than the typical 40 MPa limitation of a commercial HPLC system.

In an attempt to overcome the combined problems of packed bed stability and high efficiency separations at low backpressures and high flow rates, several groups have reported the use of monolith materials in chromatographic separations. Monolith materials are characterized by a continuous, interconnected pore structure of large macropores, the size of which can be changed independent of the skeleton size without causing bed instability. The presence of large macropores allows liquid to flow directly through with very little resistance resulting in very low backpressures even at high flow rates.

Monolith columns have been designed to disobey the trade-off rule associated with packed particle beds. Theoretically, they can exhibit combined properties of low backpressure and high efficiency that go beyond the limits of packed particle columns in pressure-driven liquid chromatography. Capillary monolith columns comprising polymeric, inorganic silica and organic-inorganic hybrid materials have been studied and reported in the literature.[2,3] The polymeric monoliths are made primarily via a radical polymerization of methacrylate or styrene-divinylbenzene(DVB) monomers and are used under electroosmotic flow in electrochromatography applications and low pressure pump driven applications because of their limited mechanical strength under high pressure.

Silica monoliths have also been applied in HPLC separations by Nakanishi et al.[3] and have demonstrated an efficiency similar to 5 μm particles but with permeability 25-30 times higher. However, due to the shrinkage of the silica skeleton, silica capillaries with an I.D. larger than 50 μm showed much lower efficiency, and in all cases 5-15% of the length of each capillary end had to be cut off to remove large voids caused by shrinkage that formed between the monolith and capillary wall before the capillary could be used.

In another publication, Nakanishi at al.[4] demonstrated the possibility of making a capillary column of 200 μm internal diameter (I.D.) from a mixture of tetramethoxysilane and methyltrimethoxysilane. However, these hybrid-type silica monoliths capillaries still had large voids caused by shrinkage that formed between the monolith and capillary wall and required cutting of 5-15% of the length of each capillary end before use. The hybrid-type silica monolith also had a threefold increase in separation impedance versus the analogous silica monolith column of 50 μm I.D.

Polymeric capillary monolith columns prepared by a UV polymerization of (3-methacryloxypropyl)trimethoxysilane were first reported by Zare et al. in 2001.[5] The elution order of the Zare column is similar to that of a reversed-phase column where larger molecular weight or more hydrophobic analytes elute later than the smaller molecular weight or more hydrophilic analytes, indicating that the polymerized methylacrylate groups are located on the surface of the monolith structure. Although Zare's work has been successfully applied in electrochromatography, poor column efficiency, poor adhesion between the capillary wall and the monolith structure, and inhomogeneity of the monolith structure were observed in pressure driven separations.[6] Moreover, as a consequence of the utilization of photopolymerization rather than thermal polymerization, the polyimide coating of the glass capillary must be removed prior to use. This unprotected fused silica tubing becomes very fragile and is easily broken. Therefore, only columns with a limited length can be prepared by this method.

Current monolith columns have significant shrinkage, resulting in poor wall adhesion, and consequently, only columns with an I.D. of less than 150 μm have been prepared. Therefore, a need exists for novel materials that overcome the problems that are associated with known materials. In particular, there is a need for monolith materials with increased resistance to shrinkage and enhanced wall adhesion that can be used to prepare chromatographic columns with an I.D. of 150 µm and greater.

SUMMARY OF THE INVENTION

The present invention provides novel hybrid inorganic/organic materials and methods for their preparation. In particular, the invention provides nanocomposite monolith materials having increased resistance to shrinkage and novel physical characteristics. The nanocomposites of the invention have enhanced capillary wall adhesion as compared to prior art monolith materials. The improved adhesion of the monoliths of the invention enables the preparation of capillary columns with an internal diameter (I.D.)≥150 µm.

Accordingly, in one aspect, the invention provides a hybrid inorganic/organic material comprising a polymerized scaffolding nanocomposite (PSN), wherein the nanocomposite contains a scaffolding functionality capable of chemically interacting with a surface of a second material.

In another aspect, the invention provides a hybrid inorganic/organic monolith comprising a polymerized scaffolding nanocomposite (PSN), wherein the nanocomposite contains a scaffolding functionality capable of chemically interacting with a surface of a second material.

Additionally, the present invention provides a method of preparation of a hybrid inorganic/organic monolith comprising a polymerized scaffolding nanocomposite (PSN), wherein the nanocomposite contains a scaffolding functionality capable of chemically interacting with a surface of a second material, said method comprising the steps of
 a) forming a sol-gel by the reaction of two or more monomers;
 b) initiating a polymerization reaction; and
 c) allowing the monomers to react through a polymerization sol-gel (PSG) reaction,
thereby preparing the hybrid inorganic/organic monolith.

In a related aspect, the invention provides a method of preparation of a hybrid inorganic/organic monolith comprising a polymerized scaffolding nanocomposite (PSN), wherein the nanocomposite contains a scaffolding functionality capable of chemically interacting with a surface of a second material, said method comprising the steps of
 a) forming a sol-gel by the reaction of two or more monomers;
 b) initiating a polymerization reaction;
 c) allowing the monomers to react through a polymerization sol-gel (PSG) reaction; and
 d) modifying the pore structure of the material,
thereby preparing the hybrid inorganic/organic monolith.

In yet another aspect, the invention provides a separations device comprising
 a) a surface capable of accepting a monolith material comprising a polymerized scaffolding nanocomposite (PSN) material, said surface comprising an anchoring functionality and
 b) a hybrid inorganic/organic monolith comprising a polymerized scaffolding nanocomposite (PSN), wherein the nanocomposite contains a scaffolding functionality capable of chemically interacting with the anchoring functionality on said surface, and wherein said hybrid organic/inorganic monolith is anchored to said surface by a chemical interaction between said scaffolding functionality and anchoring functionality.

In a related aspect, the invention provides a fused-silica capillary column, comprising
 a) a fused-silica capillary column having a cylindrical interior surface capable of accepting a monolith comprising a polymerized scaffolding nanocomposite (PSN) material, said interior surface comprising an anchoring functionality, and
 b) a hybrid inorganic/organic monolith comprising a polymerized scaffolding nanocomposite (PSN), wherein the nanocomposite contains a scaffolding functionality capable of chemically interacting with the anchoring functionality on said surface, and wherein said hybrid organic/inorganic monolith is anchored to said surface by a chemical interaction between said scaffolding functionality and anchoring functionality.

Another aspect of the invention provides a method of in situ preparation of a hybrid inorganic/organic monolith in a fused-silica capillary column, said method comprising:
 forming an anchoring functionality on an interior surface of said capillary column; and
 forming inside said capillary column a hybrid inorganic/organic monolith comprising a polymerized scaffolding nanocomposite (PSN), wherein the nanocomposite contains a scaffolding functionality capable of chemically interacting with the anchoring functionality on said surface, said monolith being formed by:
 a) forming a sol-gel by the reaction of two or more monomers;
 b) initiating a polymerization reaction; and
 c) allowing the monomers to react through a polymerization sol-gel (PSG) reaction;
whereby said scaffolding functionality and said anchoring functionality chemically interact to thereby anchor said monolith to said surface, such that a hybrid inorganic/organic monolith is prepared in situ in a fused-silica capillary column.

In another related aspect, the invention provides a method of in situ preparation of a hybrid inorganic/organic monolith in a fused-silica capillary column, said method comprising:
 forming an anchoring functionality on an interior surface of said capillary column; and
 forming inside said capillary column a hybrid inorganic/organic monolith comprising a polymerized scaffolding nanocomposite (PSN), wherein the nanocomposite contains a scaffolding functionality capable of chemically interacting with the anchoring functionality on said surface, said monolith being formed by:
 a) forming a sol-gel by the reaction of two or more monomers;
 b) initiating a polymerization reaction;
 c) allowing the monomers to react through a polymerization sol-gel (PSG) reaction; and
 d) modifying the pore structure of the monolith,
whereby said scaffolding functionality and said anchoring functionality chemically interact to thereby anchor said monolith to said surface, such that a hybrid inorganic/organic monolith is prepared in situ in a fused-silica capillary column.

Another aspect of the invention provides an inorganic/organic hybrid monolith comprising a scaffolding functionality capable of chemically interacting with a surface of a second material, produced by the process of
 a) forming a sol-gel by the reaction of two or more monomers;
 b) initiating a polymerization reaction; and
 c) allowing the monomers to react through a polymerization sol-gel (PSG) reaction.

In a related aspect, the invention provides an inorganic/organic hybrid monolith comprising a scaffolding functionality capable of chemically interacting with a surface of a second material, produced by the process of a) forming a sol-gel by the reaction of two or more monomers;

b) initiating a polymerization reaction;

c) allowing the monomers to react through a polymerization sol-gel (PSG) reaction; and d) modifying the pore structure of the monolith.

In yet another related aspect, the invention provides a method of preparation of a hybrid inorganic/organic material comprising a polymerized scaffolding nanocomposite (PSN), comprising the steps of a) forming a sol-gel by the reaction of two or more monomers;

b) initiating a polymerization reaction; and c) allowing the monomers to react through a polymerization sol-gel (PSG) reaction, thereby preparing the hybrid inorganic/organic monolith, wherein the monolith contains a scaffolding functionality capable of chemically interacting with a surface of a second material.

In another aspect, the invention provides a method of preparation of a hybrid inorganic/organic material comprising a polymerized scaffolding nanocomposite (PSN), comprising the steps of a) forming a sol-gel by the reaction of two or more monomers;

b) initiating a polymerization reaction;

c) allowing the monomers to react through a polymerization sol-gel (PSG) reaction; and d) modifying the pore structure of the material, thereby preparing the hybrid inorganic/organic material, wherein the nanocomposite contains a scaffolding functionality capable of chemically interacting with a surface of a second material.

Yet another aspect of the invention provides a capillary column, wherein the interior surface of the capillary column is derivatized with a polymerizable anchoring functionality.

BRIEF DESCRIPTION OF DRAWINGS

FIG. 1A depicts examples of hybrid and inorganic monomers in chemical structure and schematic form. FIG. 1B is a schematic depiction of hybrid and inorganic monomer hydrolysis and oligomerization. Figure C is a simplified depiction of the PSG reaction to form a cross-sectional block of polymerized scaffolding nanocomposite material. Figure D is a simplified cross-sectional view of the PSN material, including expanding views of the PSN material.

DETAILED DESCRIPTION OF THE INVENTION

Figure 1A:
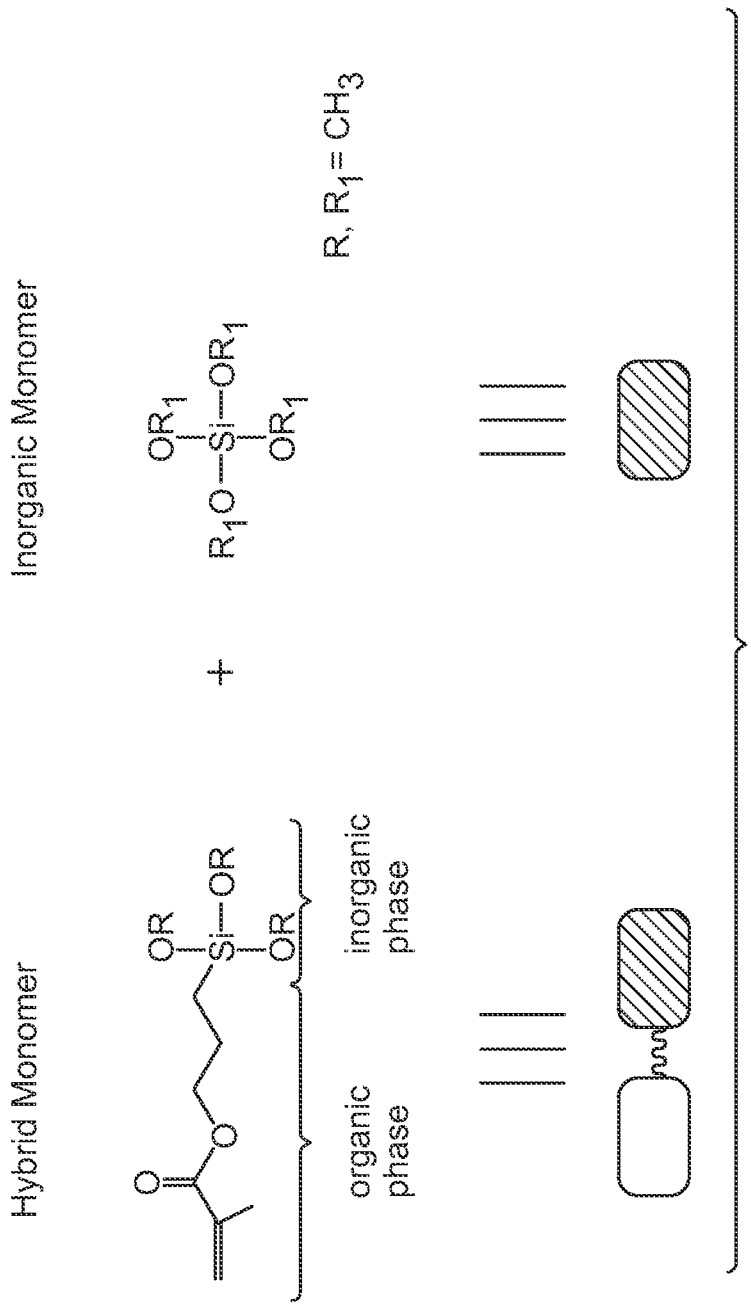
FIGS. 1A-1D depict a schematic representation of monoliths made by the polymerization sol gel (PSG) reaction.

The present invention provides novel hybrid inorganic/organic materials, and methods for their preparation. In particular, the invention provides nanocomposite monolith materials having increased resistance to shrinkage and novel physical characteristics. The nanocomposites of the invention have enhanced capillary wall adhesion, as compared to prior art monolith materials. The improved adhesion of the monoliths of the invention enables the preparation of capillary columns with an internal diameter (I.D.)≥150 μm.

In an advantageous embodiment, the invention provides novel, inorganic/organic monolith materials inside a fused silica capillary column. In accordance with this embodiment, the monoliths of the invention are prepared in situ inside a surface-modified fused silica capillary column through simultaneous organic polymerization and sol-gel reaction of a silane mixture that has an organosilane monomer containing at least one organic polymerizable group, such as, e.g., (3-methacryloxyproply)trimethoxysilane.

DEFINITIONS

These and other embodiments of the invention will be described with reference to following definitions that, for convenience, are collected here.

The term "alicyclic group" includes closed ring structures of three or more carbon atoms. Alicyclic groups include cycloparaffins or naphthenes that are saturated cyclic hydrocarbons, cycloolefins which are unsaturated with two or more double bonds, and cycloacetylenes which have a triple bond. They do not include aromatic groups. Examples of cycloparaffins include cyclopropane, cyclohexane, and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl, and the like. As used herein, the term "nitro" means —$NO_2$; the term "halogen" designates —F, —Cl, —Br or —I; the term "thiol" means SH; and the term "hydroxyl" means —OH.

The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alkoxy" as used herein means an alkyl group, as defined herein, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like.

The term "alkyl" includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more preferably 18 or fewer. Likewise, preferred cycloalkyls have from 4-10 carbon atoms in their ring structure, and more preferably have 4-7 carbon atoms in the ring structure. The term "lower alkyl" refers to alkyl groups having from 1 to 6 carbons in the chain, and to cycloalkyls having from 3 to 6 carbons in the ring structure.

Moreover, the term "alkyl" (including "lower alkyl") as used throughout the specification and claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "alkylamino" as used herein means an alkyl group, as defined herein, having an amino group attached thereto. Exemplary alkylamino groups include groups having 1 to about 12 carbon atoms, preferably from 1 to about 6 carbon atoms.

The term "alkylthio" refers to an alkyl group, as defined herein, having a sulfhydryl group attached thereto. Exemplary alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "amino," as used herein, refers to an unsubstituted or substituted moiety of the formula —$NR_aR_b$, in which $R_a$ and $R_b$ are each independently hydrogen, alkyl, aryl, or heterocyclyl, or $R_a$ and $R_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of $R_a$ and $R_b$, is further substituted with an amino group.

The language "anchoring functionality" is intended to include functional moieties that promote the ability of the second material to chemically interact with the PSN material. In certain embodiments, the anchoring functionality is a polymerizable group, including, but not limited to vinyl, acrylate, methacrylate, acrylamide, methacrylamide, styrene, divinylbenzene, itaconate, fumarate, alkyne, azo compounds, and combinations thereof.

The term "anchoring" refers to the act of adhesion of one material to a second material. The extent of adhesion is a direct result of the chemical interaction of the first material with the second material, and is intended to include a range of interactions which extend from flexible interactions to strict immobilization.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine, and the like. Aryl groups also include polycyclic fused aromatic groups such as naphthyl, quinolyl, indolyl, and the like. The aromatic ring can be substituted at one or more ring positions with such substituents, e.g., as described above for alkyl groups. Suitable aryl groups include unsubstituted and substituted phenyl groups.

The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The language "azo compounds" is intended to include azo containing groups as surface functionalities. These azo groups on the surface can initiate the polymerization from the surface into the bulk nanaocomposite. This approach is achieved using silanes that contain azo groups in them and that can be bonded onto the walls of the glass capillaries.[9,10]

The language "chemical interaction" is intended to include, but is not limited to hydrophobic/hydrophilic, ionic (e.g., coulombic attraction/repulsion, ion-dipole, charge-transfer), chemical bonding, Van der Waals, and hydrogen bonding. The term chemical interaction is meant to be distinguished from physical interactions, such as physical friction between surfaces.

The language "chemical bonding" is intended to include the formation of a covalent bond, e.g., organic covalent bond or inorganic covalent bond. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds, i.e., silicon-oxygen-silicon bonds are defined as inorganic covalent bonds.

The language "capillary column" refers to a chromatographic column with internal diameters (I.D.) in the range of 50-2000 μm.

The terms "coalescing" and "coalesced," as used in the language "coalesced particles" are intended to describe a material in which several individual components have become coherent to result in one new component by an appropriate chemical or physical process, e.g., heating. The term coalesced is meant to be distinguished from a collection of individual particles in close physical proximity, e.g., in a bed formation, in which the end product comprises individual particles.

The language "dense material" is intended to include hybrid materials, which upon view of an axial cross-section of the material's surface are comprised of the hybrid material and macropores with an average diameter of less than 0.5 μm that separate the hybrid material.

The terms "derivatized" or "derivatization" are intended to include to the property or characteristic of anchoring or coating an agent of alternate functionality onto a second material by conversion of the functionality of the receiving surface of the second material to the alternate functionality, e.g., by coating or chemical bonding, e.g., polymerization.

The term "functionalizing group" includes organic groups which impart a certain chromatographic functionality to a chromatographic stationary phase, including, e.g., octadecyl ($C_{18}$) or phenyl. Such functionalizing groups are present in, for example, surface modifiers such as disclosed herein which are attached to the base material, e.g., via derivatization or coating and later crosslinking, imparting the chemical character of the surface modifier to the base material. In one embodiment, such surface modifiers have the formula $Z_a(R')_b$ Si—R, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl.

The functionalizing group R may include alkyl, alkenyl, alkynyl, aryl, cyano, amino, diol, nitro, ester, a cation or anion exchange group, embedded polar functionalities, or an alkyl or aryl group containing an embedded polar functionality. Examples of suitable R functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, the text of which is incorporated herein by reference. Such groups include those of the general formula

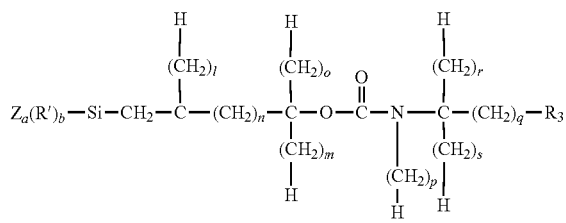

wherein l, m, o, r, and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. Preferably, the carbamate functionality has the general structure indicated below:

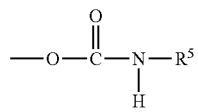

wherein $R^5$ may be, e.g., cyanoalkyl, t-butyl, butyl, octyl, dodecyl, tetradecyl, octadecyl, or benzyl. Advantageously, $R^5$ is octyl, dodecyl, or octadecyl.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "hybrid", i.e., as used in the language "inorganic/organic hybrid material" or "inorganic/organic hybrid monolith" includes inorganic-based structures wherein an organic functionality is integral to both the internal or "skeletal" inorganic structure. The inorganic portion of the hybrid material may be selected from, but are not limited to alumina, silica, titanium oxide, zirconium oxide, and ceramic material. In one embodiment the inorganic portion of the hybrid material is silica.

The language "Hydrophile-Lipophile Balance (HLB)," is art recognized and is intended to characterize the solubility of surfactants. The number provides a guide to the skilled artisan in deciding which surfactant to use in a given emulsion. Surfactants with an HLB number of <10 (or depending on your reference, 3-6) have an affinity for oil over water, and as a result water droplets tend to form in an oil phase. The converse is true for surfactants with HLB numbers >10 (or 8-13), which have an affinity for water over oil, and as a result oil droplets tend to form in a water phase. In certain embodiments the HLB number typically ranges from 0 to about 15, but can go as high as 60. The HLB number may be derived by a variety of methods, providing a relative, rather than an exact value.

The term "material" as it is used herein, is intended to include three-dimensional copolymers that have been formed in a single piece. In one embodiment, the material of the invention is prepared by casting precursors into a mold of a desired shape. Materials of the invention include, but are not limited to polymeric materials such as monoliths or non-monolith materials, e.g., particles, copolymers with low porosity, or porous copolymers that do not have interconnected pore structure.

The term "macropore" is intended to include pores of a material, or channels through the material, which allow liquid to flow directly through the material with reduced resistance at chromatographically-useful flow rates. For example, macropores of the present invention are intended to include, but are not limited to pores with a pore diameter larger than about 0.05 µm, pores with a pore diameter ranging from about 0.1 µm to about 10 µm, pores with a pore diameter ranging from about 0.5 µm to about 5 µm, and pores with a pore diameter ranging from about 0.8 µm to about 4 µm. It should be understood that the selection of macropore size in the materials of the invention for use in chromatography may be analyzed based on, at least, column backpressure and efficiency. If the macropore size is too small, the column backpressure will become too great for chromatographic use, while if the macropore diameter is too large, the column will lose chromatographic efficiency.

The language "minimally water soluble," is intended to include the ability of the compound to remain at least soluble enough to allow the intended reaction to move forward. In certain embodiments, the language "minimally soluble" is intended to include a range of solubility between sparingly soluble and fully soluble. It should be understood that the solubility includes solubility induced by using, for example, heat or additional reagents. In certain embodiments, 2,2'-azobis(isobutyronitrile) would be understood by one skilled the art to be minimally water soluble.

The term "monolith" refers to a porous, three-dimensional material having a continuous interconnected pore structure in a single piece. The term monolith is meant to be distinguished from a collection of individual particles packed into a bed formation, in which the end product comprises individual particles. The term monolith is also meant to be distinguished from three-dimensional polymers with low porosity or porous three-dimensional polymers that do not have interconnected pore structure. In one embodiment, a monolith of the invention is prepared by casting precursors into a mold of a desired shape. In another embodiment, the monolith comprises coalesced particles. In yet another embodiment, the monolith material may be used for chromatography, i.e., the monolith is a chromatographically useful material, e.g., a chromatographic column.

Figure 1B:
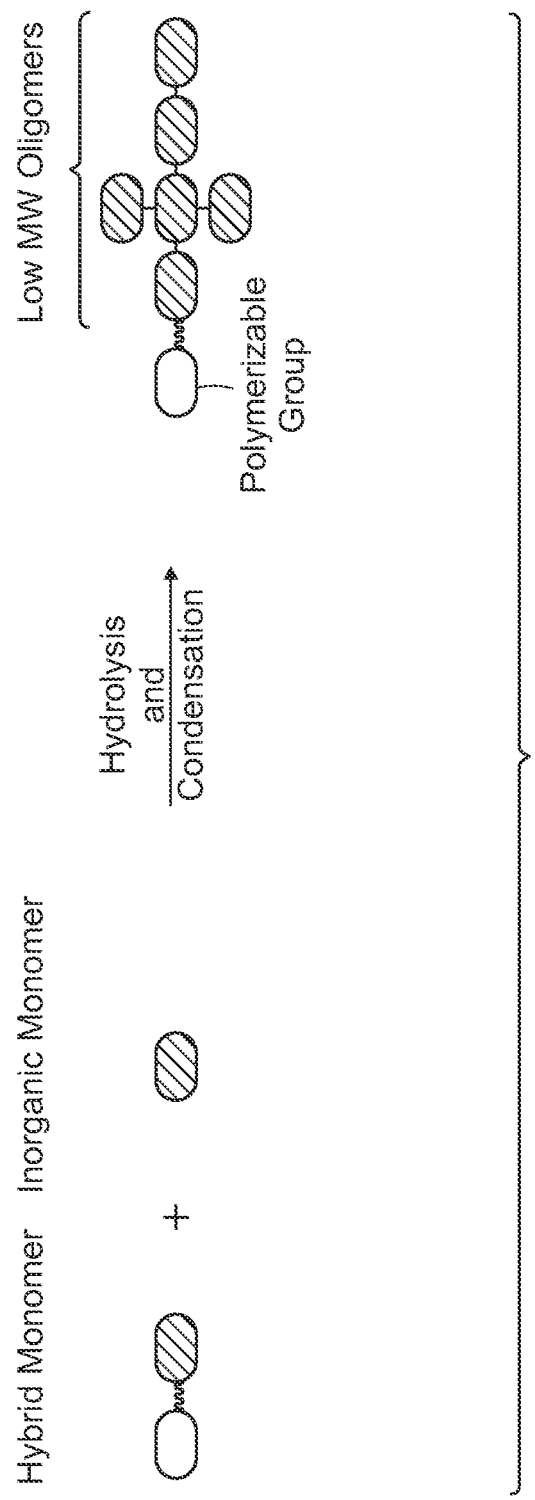
Figure 1C:
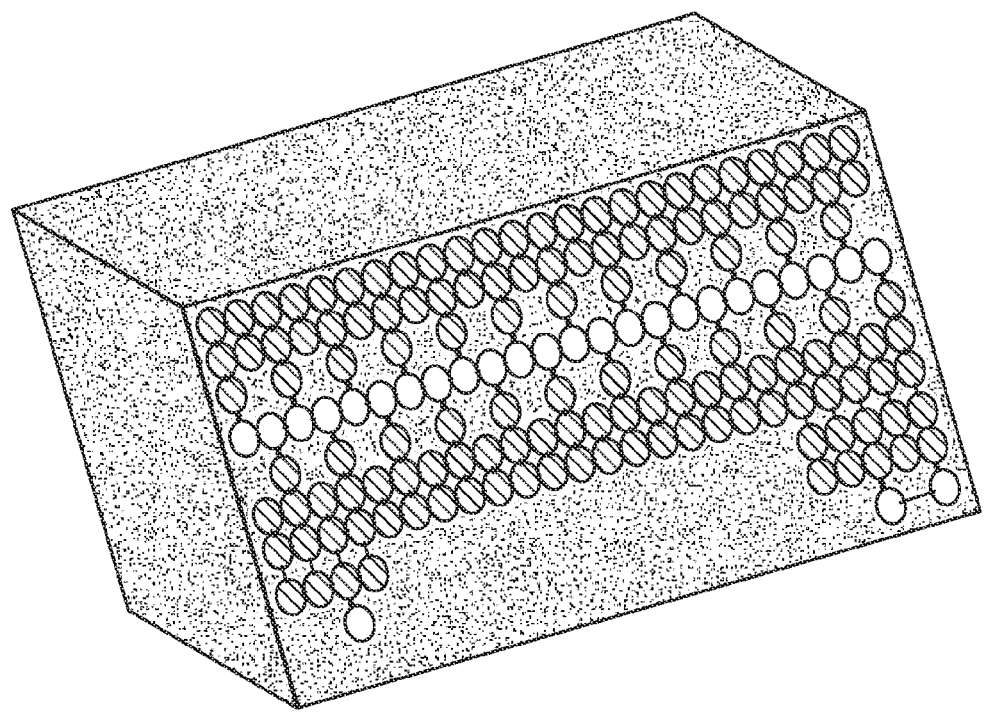
Figure 1C:
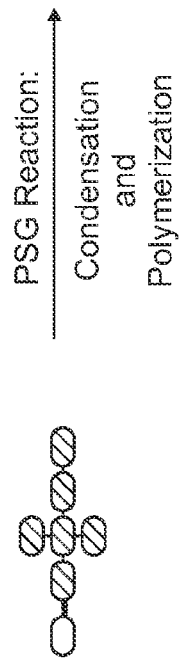
Figure 1D:
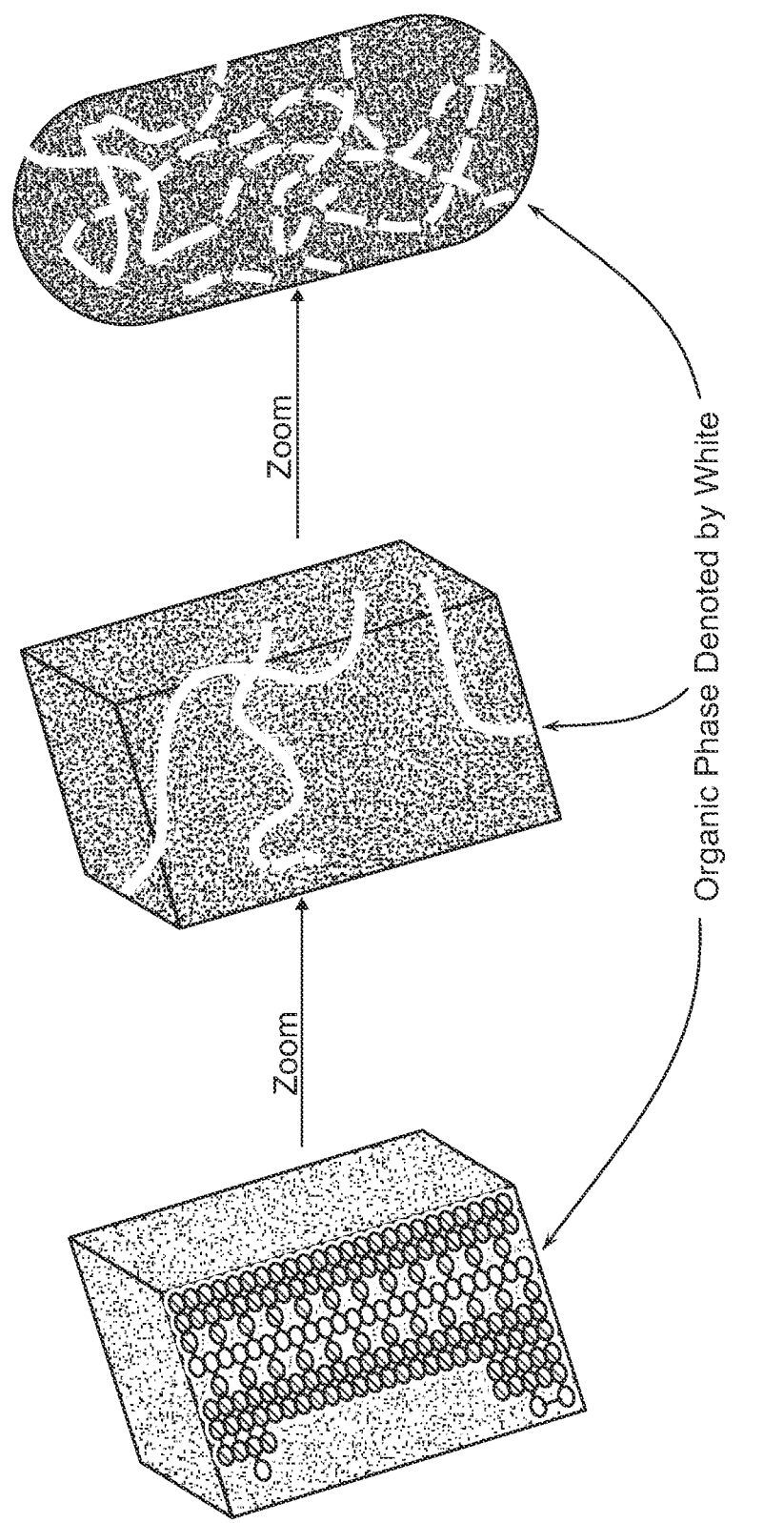

The term "nanophase" refers to organic or inorganic phase aggregations that have formed based on phase separations at the molecular level. In particular embodiments of the invention, phase separation at the molecular level is generated upon the simultaneous reaction of hybrid and inorganic monomers through a polymerization sol-gel reaction. FIG. 1 is a graphical depiction of the polymerization sol-gel reaction of the invention that leads to the production of organic and inorganic nanophases.

The language "polymerized scaffolding nanocomposite (PSN)" refers to hybrid composite materials that comprise a polymerized organic nanophase surrounded by an inorganic nanophase, e.g., polymerized siloxane, wherein the nanophases form independently through independent reactions, e.g., a polymerization and a sol gel reaction, and wherein the organic and inorganic nanophases interconnect by chemical bond formation through a hybrid monomer, e.g., by condensation of the inorganic phase, e.g., of the hybrid monomer to an inorganic monomer; and polymerization of the organic phase, e.g., radical polymerization, such that a hybrid material forms with a plurality of surface scaffolding functionalities.

The language "polymerization sol-gel (PSG) reaction" refers to the approach of preparing hybrid materials using simultaneous polymerization reactions and sol-gel reactions, wherein the organic and inorganic nanophases interconnect by chemical bond formation through an interaction with a hybrid monomer, e.g., by condensation of the inorganic phase, e.g., of the hybrid monomer to an inorganic monomer; and polymerization of the organic phase, e.g., radical polymerization, such that a hybrid material forms. In a particular embodiment, the materials are made from a mixture of a tetraalkoxysilane, e.g., tetramethoxysilane, and a polymerizable organosilane, e.g., (3-methacryloxypropyl)trimethoxysilane, wherein the organosilane is minimally water soluble, e.g., sufficient to produce a polymerized scaffolding nanocomposite (i.e., the polymerizable group will have an affect on this solubility). For example, the starting silanes have limited solubility in water. As the SiOR bonds are hydrolyzed to SiOH, the SiOH monomer that forms is substantially soluble in water.

The term "polymerization" refers to any process that results from the bonding or coupling of smaller molecules to form a larger molecule. One skilled in the art would recognize that the term "polymerization" is intended to include a range of different degrees of polymerization, i.e., ranging from a single reaction, e.g., two molecules reacting to form a dimer, to a plurality of reactions, e.g., a large number of molecules reacting to form a macromolecule.

The language "scaffolding functionality" refers to functional moieties, such as organic functionalities, e.g., of organosilanes, that are capable of chemically interacting with a surface of a second material, e.g., a containment vessel, thus allowing the PSN material to anchor to the second material, and thereby become immobilized relative thereto. In certain embodiments of the invention, the functional moiety is a "polymerizable group" including, but not limited to vinyl, acrylate, methacrylate, e.g., 3-methacryloxypropyl, acrylamide, methacrylamide, styrene, e.g., styrylethyl, divinylbenzene, itaconate, fumarate, alkyne, and combinations thereof. The ordinarily skilled artisan would understand that the scaffolding functionality would be consumed during a polymerization reaction to varying extents depending on the reaction conditions chosen, and that the above listed functionalities are provided in their unreacted or monomeric state.

The language "second material" is intended to include any second material with a surface capable of receiving the PSN material.

The language "surface modifiers" is intended to include functionalizing groups that impart a certain chromatographic functionality to a chromatographic stationary phase. Surface modifiers such as disclosed herein are attached to the base material, e.g., via derivatization or coating and later crosslinking, imparting the chemical character of the surface modifier to the base material.

The language "wall adhesion" refers to a property of a material, e.g., a PSN material, in which the material possesses sufficient chemical interaction between the material and a second material (e.g., the inside wall of a capillary column) such that the chemical interactions are retained upon subjection of the material to additional factors, e.g., during use of the material in chromatographic separations. In certain embodiments, the PSN material possesses sufficient wall adhesion so as to minimize or preclude flow paths between the PSN material and the second material, e.g., chromatographic column, where said flow paths would be deleterious to separation efficacy in the chromatographic column.

I. Compositions of Matter

In one aspect, the invention provides a hybrid inorganic/organic material comprising a polymerized scaffolding nanocomposite (PSN), wherein the nanocomposite contains a scaffolding functionality capable of chemically interacting with a surface of a second material. The hybrid material includes inorganic-based structures wherein an organic functionality is integral to both the internal or "skeletal" inorganic structure, wherein the inorganic portion is selected from, but not limited to silica, alumina, zirconium oxide, titanium oxide, ceramics, tin oxide, and combinations thereof.

In certain embodiments, the organic functionality of the hybrid material is derived, at least in part, from a hybrid monomer, e.g., an organosilane, e.g., an organoalkoxysilane, which comprises both an inorganic and organic component, i.e., relating to the presence of both a silicon-oxygen bond and a carbon-silicon bond in a single monomeric unit. In certain embodiments, the organosilane is an organoalkoxysilane having the formula $R^2Si(OR^1)_3$ or $R^6[Si(OR^1)_3]_m$ where $R^2$ is a styryl, vinyl, an acrylate, methacrylate, acrylamide, methacrylamide, divinylbenzene, itaconate, fumarate, substituted or unsubstituted $C_1$-$C_{18}$ alkenylene, alkynylene or arylene, or a combination thereof; $R^1$ is a $C_1$-$C_4$ alkyl moiety; $R^6$ is a substituted or unsubstituted $C_1$-$C_{18}$ alkenylene, alkynylene or arylene moiety bridging two or more silicon atoms; and m is an integer greater than or equal to two. In certain embodiments, $R^2$ is vinyl, methacryloxypropyl, methacrylamidepropyl, or styrylethyl and $R^1$ is methyl or ethyl; or $R^6$ is a bridging N,N-bis(propylene) acrylamide group, m=2, and $R^1$ is ethyl or methyl. In a specific embodiment of the invention, the organosilane is (3-methacryloxypropyl)trimethoxysilane. In certain embodiments, the organosilane is minimally water soluble, e.g., sufficient to produce a polymerized scaffolding nanocomposite.

In one embodiment, the PSN is the product of a reaction of a hybrid organic/inorganic monomer, e.g., an organosilane, and an inorganic monomer, e.g., a silane monomer. In a specific embodiment, the PSN is the product of a reaction of a tetraalkoxysilane and an organosilane containing at least one polymerizable group, e.g., 3-methacryloxypropyl or styrylethyl.

In one embodiment, the tetraalkoxysilane has the formula $Si(OR^1)_4$, where $R^1$ is a $C_1$-$C_3$ alkyl moiety, e.g., tetramethoxysilane or tetraethoxysilane. In certain embodiments, the organosilane and/or tetraalkoxysilane are minimally water soluble, e.g., sufficient to produce a polymerized scaffolding nanocomposite. In a particular embodiment, the (3-methacryloxypropyl)trimethoxysilane and the tetramethoxysilane are present in a volume to volume ratio of 1 to 4.

The hybrid inorganic/organic material may be cast in any shape by techniques well known in the art, such as molding, so long as the properties of the material are not substantially affected. In one embodiment of the invention the hybrid inorganic/organic material is a porous hybrid inorganic/organic monolith, e.g., a capillary monolith. The monoliths of the present invention have improved properties including, but not limited to enhanced wall adhesion, i.e., capillary wall adhesion, and increased resistance to shrinkage and improved mechanical stability in comparison to capillary monoliths known in the art.

In certain embodiments of the invention, the polymerizable organo groups are embedded inside the silica skeleton, which yields monoliths that have high surface silanol concentrations, i.e., a large population of chromatographically accessible silanols, and with essentially no chromatographically accessible or useful organo groups. The monolith skeletons of these monoliths are composed of an organic-inorganic nanocomposite, wherein the organic moiety is embedded inside the inorganic silica network. This approach offers monoliths with an increased resistance to shrinkage as well as good resistance to shrinking and swelling upon exposure to organic solvent. In certain embodiments, the shrinkage of the silica skeleton/scaffold will be minimized due to the high organic content. Thus, monolith columns with IDs of greater than 50 μm, e.g., 1-2 mm, can be prepared in-situ using this method of reaction.

In an alternate embodiment, the polymerized organic phase is chromatographically accessible and changes the hydrophobicity of the porous surface, resulting in novel selectivities for chromatographic separations. In certain embodiments, the extent to which the organic phase is chromatographically accessible depends on the extent to which the scaffolding functionality is consumed upon anchoring of the PSN material to the interior surface of the chromatographic column. In particular embodiments, unpolymerized scaffolding functionality may directly, e.g., methacrylate groups, or indirectly, e.g., hydrolyzed methacrylate groups, provide the chromatographically accessible organic phase. This polymerization reaction may be regulated to produce desired chromatographic selectivities.

In accordance with the invention, the PSN contains a scaffolding functionality that is capable of chemically interacting with a surface of a second material, e.g., a containment vessel, thus allowing the PSN material to anchor to the second material. In certain embodiments of the invention, the scaffolding functionality is a "polymerizable group" including, but not limited to vinyl, acrylate, methacrylate, e.g., 3-methacryloxypropyl, acrylamide, methacrylamide, styrene, e.g., styrylethyl, divinylbenzene, itaconate, fumarate, alkyne, and combinations thereof.

The improved properties afforded by the invention, e.g., enhanced wall adhesion and/or increased resistance to shrinkage, are the result of the scaffolding functionality that anchors the polymer to the wall of the containment vessel. The ordinarily skilled artisan would understand that the scaffolding functionality would be substantially consumed during a polymerization reaction, and that the above-listed functionalities are provided in their unreacted or monomeric state.

The second material, in accordance with the invention, is any material having a surface that is capable of receiving the PSN material. In certain embodiments, the second material is a containment vessel, which provides supportive enclosure to the PSN material. The second material, e.g., containment vessel, may be used as the primary reaction vessel for preparation of the PSN material, or the PSN material may be prepared independently of the second material and subsequently transferred to the second material, e.g., a secondary containment vessel, such that the PSN material is capable of interacting with the second material.

In one embodiment, the containment vessel is used as the reaction vessel, whereby chemical interactions, such as chemical bonding, e.g., covalent bonding, occur between the forming PSN material and the second material during the polymerization of the PSN material. In an alternative embodiment, the PSN material is subsequently transferred to the second material, such as a secondary containment vessel, wherein chemical interactions, such as chemical bonding, e.g., covalent bonding, occur through further chemical processing, e.g., addition of a crosslinking agent, photoinitiation of a radical polymerization reaction, or addition of a hydrosilylation catalyst for a hydrosilylation reaction. The containment vessels that may be utilized for PSN materials of the present invention include, but are not limited to a chromatographic column, e.g., capillary column, e.g., a fused silica capillary column, a glass lined steel column, a radial compression column, a trap column, a microfluidic device, a microchip, a sensor, an electronic circuit, a solid phase extraction (SPE) device, e.g., a miniaturized SPE device, and an on-column frit.

In certain embodiments, the second material in itself has functionality suitable for interaction with the nanocomposite. In other embodiments, the surface of the second material is derivatized with an anchoring functionality or treated to provide the anchoring functionality.

The anchoring functionality and the scaffolding functionality may be copolymerizable, such that a covalent bond is formed as a result of copolymerization of the scaffolding and anchoring functionalities. In one embodiment, this polymerization may be initiated by a radical initiator, including, but not limited to 2,2'-azobis(isobutyronitrile), 2,2'-azobis(2-methylpropionamidine)dihydrochloride, 4,4'-azobis(4-cyanovaleric acid), potassium persulfate, and peracetic acid. In addition, the radical initiator is at least minimally soluble, e.g., minimally water soluble.

In certain embodiments, the present invention involves the interaction of silanol functionalities, e.g., chemical bonding between a silanol of second surface and a silanol of the PSN material (i.e., a glass capillary surface containing silanols that react with the Si—OH groups of a silica sol to form a bridging siloxane between a gelling monolith and the capillary wall). However, it should be understood that in certain embodiments where the chemical interaction is the interaction of silanol functionalities, this interaction is in combination with other chemical interaction(s), e.g., chemical bonding, through polymerization, e.g., forming an organic chemical bond. In certain other embodiments the chemical interaction is not the interaction of silanol functionalities.

In another aspect, the invention provides a PSN that is a composite material prepared by the polymerization sol-gel reaction described herein below. For example, in one embodiment, the preparation of a PSN material comprises the steps of a) forming a sol-gel by the reaction of two or more monomers;

b) initiating a polymerization reaction; and c) allowing the monomers to react through a polymerization sol-gel (PSG) reaction.

In certain embodiments, the preparation of the PSN may further comprise the step of (d) modifying the pore structure of the material. The porous inorganic/organic hybrid materials of the invention may be used as prepared by the process noted above and further described in Section II below, without further modification.

Alternatively, the hybrid materials of the invention may be further modified by one or more processing treatments, e.g., by: chemical processing treatment, such as derivatization of surface functionalities of the thus-prepared material; incorporating additives to the PSG reaction that affect the physical properties, e.g., porogens, such as surfactants or solvents, e.g., toluene; physical processing treatments, such as hydrothermal treatment; or a combination of several processing treatments.

Chemical Processing

A. Incorporation of Additives

In one embodiment, the pore structure of the materials of the invention, e.g., monolith materials, is modified by further including a surfactant or combination of different surfactants in the PSG reaction. In a specific embodiment, the surfactant or combination of surfactants includes at least one nonionic surfactant. Exemplary nonionic surfactants include but are not limited to surfactants comprised of block copolymers of polyethylene glycol and polypropyleneglycol, surfactants comprised of alkylphenoxypolyethoxyethanol, and polyethyleneglycol, e.g., Pluronic F38. In particular embodiments, the surfactant or combination of surfactants are selected from surfactants with a hydrophile-lipophile balance ranging from about 0 to 60, e.g., about 10 to 50, e.g., about 20 to 40, e.g., about 30 to 40, e.g., about 33.

The surfactants are believed to enhance the concentration of water and the acid/base catalyst on the surface of the material during the polymerization sol-gel reaction. Use of surfactants to modulate the surface structure of the material stabilizes the polymer material that is forming throughout the reaction, and minimizes or suppresses inhomogeneous morphology.

B. Surface Modification

The methods of preparation may further comprise surface modifying the materials of the invention, e.g., the monolith materials of the invention. The hybrid materials of the invention possess both organic groups and silanol groups, which may be additionally substituted or derivatized with a surface modifier.

In one embodiment of the invention, surface organic groups of the porous inorganic/organic hybrid material are derivatized or modified in a subsequent step via formation of an organic covalent bond between the modifying reagent and organic groups of the material, wherein the material retains sufficient scaffolding functionality such that the material is able to interact with a second material. Alternatively, the surface silanol groups of the hybrid silica are derivatized into siloxane organic groups, such as by reacting with an organotrihalosilane, e.g., octadecyltrichlorosilane, or a halopolyorganosilane, octadecyldimethylchlorosilane. Alternatively, the surface organic and silanol groups of the hybrid silica are both derivatized.

In a particular embodiment, the silanol groups are surface modified with compounds having the formula $Z_a(R')_b Si—R$, where $Z$=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl. In additional embodiments, the organic groups may be similarly functionalized.

In one embodiment, the organic groups of the hybrid materials react to form an organic covalent bond with a surface modifier. The modifiers can also form an organic covalent bond to the material's organic group via a number of mechanisms well known in organic and polymer chemistry including but not limited to nucleophilic, electrophilic, cycloaddition, free-radical, carbene, nitrene, and carbocation reactions.

In one embodiment, the surface modifier may be an organotrihalosilane, such as octyltrichlorosilane or octadecyltrichlorosilane. In an additional embodiment, the surface modifier may be a halopolyorganosilane, such as octyldimethylchlorosilane or octadecyldimethylchlorosilane. In certain other embodiments the surface modifier is octadecyldimethyl-N,N-dimethylaminosilane.

In another embodiment, the surface of the hybrid silica material may also be surface modified by coating with a polymer. Polymer coatings are known in the literature and may be provided generally by polymerization or polycondensation of physisorbed monomers onto the surface without chemical bonding of the polymer layer to the support (type I), polymerization or polycondensation of physisorbed monomers onto the surface with chemical bonding of the polymer layer to the support (type II), immobilization of physisorbed prepolymers to the support (type III), and chemisorption of presynthesized polymers onto the surface of the support (type IV)[11]. As noted above, coating the hybrid material with a polymer may be used in conjunction with various surface modifications described in the invention.

Moreover, the surface, of the materials of the invention may contain residual organic groups, which can be derivatized by reacting with a reagent that is reactive towards the organic group. For example, vinyl groups, e.g., unreacted methacrylate groups, on the particle can be reacted with a variety of olefin reactive reagents such as bromine ($Br_2$), hydrogen ($H_2$), free radicals, propagating polymer radical centers, dienes, and the like. In another example, hydroxyl groups on the material can be reacted with a variety of alcohol reactive reagents such as isocyanates, carboxylic acids, carboxylic acid chlorides, and reactive organosilanes as described below. Reactions of this type are well known in the literature, see, e.g., March, J. "Advanced Organic Chemistry," $3^{rd}$ Edition, Wiley, New York, 1985; Odian, G. "The Principles of Polymerization," $2^{nd}$ Edition, Wiley, New York, 1981; the texts of which are incorporated herein by reference. Moreover, regulation of the extent of the (methacrylate) polymerization reaction may be used to supply more or less organic groups for derivatization with reagents that are reactive to the organic functionalities.

In addition, the surface of the materials of the invention contain silanol groups, which can be derivatized by reacting with a reactive organosilane. The surface derivatization of the hybrid material may be conducted according to standard methods, for example by reaction with octadecyltrichlorosilane or octadecyldimethylchlorosilane in an organic solvent at elevated temperature. An organic solvent such as toluene or methylene chloride is typically used for this reaction. An organic base such as pyridine or imidazole is added to the reaction mixture to catalyze the reaction. The product of this reaction is then washed with one or more solvents such as methanol, water, toluene, methylene chloride, and/or acetone and can be sometimes further dried at about 80° C. to 100° C. under reduced pressure for about 16 h. The resultant hybrid material can be further reacted with a short-chain silane such as trimethylchlorosilane to endcap any remaining silanol groups, by using a similar procedure described above.

C. Hydrothermal Treatment

In addition, materials of the invention, e.g., the monolith materials of the invention, may be subjected to hydrothermal treatment to improve the material's pore structure, e.g., by further condensation of the siloxane polymer network formed during the PSG reaction, and dissolution and redeposition of silicic acid silicates from and to the surface of the pore structure. In particular, this treatment would be applicable after the polymerization achieved a solid state. In one embodiment, the hydrothermal treatment is in a basic solution at an elevated or high temperature, e.g., 120° C. (i.e., the hydrothermal treatment is run in the capillary). The range of pH of the hydrothermal treatment is about 6-12, e.g., about 8-11, e.g., about 9-10. The monolith material is then rinsed with water followed by a solvent exchange, e.g., with methanol; ethanol; acetonitrile; or tetrahydrofuran followed by room temperature, e.g. about 20-25° C., drying. The material is then dried at about 25-120° C., and preferably at about 70° C., under vacuum overnight.

In one embodiment, the condensation is base catalyzed, e.g., by ammonia. In certain embodiments, the ammonia is generated by the high temperature decomposition of urea or a suitable organic amide.

The surface of the hydrothermally treated hybrid material may be modified in a similar fashion to that of the hybrid material that is not modified by hydrothermal treatment as described above. For example, in a subsequent step, the surface organic groups of the hybrid material may be optionally modified via formation of a covalent bond between the monolith material's organic and/or silanol group and the modifying reagent, and optionally including coating with a polymer, i.e., also as is described above.

II. Methods of Preparation

In a related aspect, the invention provides a method of preparation of a hybrid inorganic/organic material comprising a polymerized scaffolding nanocomposite (PSN), comprising the steps of a) forming a sol-gel by the reaction of two or more monomers;

b) initiating a polymerization reaction; and c) allowing the monomers to react through a polymerization sol-gel (PSG) reaction, thereby preparing the hybrid inorganic/organic monolith, wherein the monolith contains a scaffolding functionality capable of chemically interacting with a surface of a second material. In certain embodiments, the methods further comprise the step of (d) modifying the pore structure of the material. As described above, the resulting PSN material may be subsequently transferred to the second material, such as a secondary containment vessel, wherein chemical interactions, such as chemical bonding, e.g., covalent bonding, occur through further chemical processing, e.g., addition of a crosslinking agent, photoinitiation of a radical polymerization reaction, or addition of a hydrosilylation catalyst for a hydrosilylation reaction.

Alternatively, the invention provides a method for in situ preparation of a hybrid inorganic/organic monolith in a chromatographic column, e.g., a capillary column, e.g., a fused-silica capillary column. The method comprises:

forming an anchoring functionality on an interior surface of said chromatographic column; and forming inside the chromatographic column a hybrid inorganic/organic monolith comprising a polymerized scaffolding nanocomposite (PSN), wherein the nanocomposite contains a scaffolding functionality capable of chemically interacting with the anchoring functionality on the surface, the monolith being formed by:

a) forming a sol-gel by the reaction of two or more monomers;

b) initiating a polymerization reaction; and c) allowing the monomers to react through a polymerization sol-gel (PSG) reaction; whereby the scaffolding functionality and the anchoring functionality chemically interact to thereby anchor the monolith to the surface, such that a hybrid inorganic/organic monolith is prepared in situ in the chromatographic column. In certain embodiments, the in situ process involves covalent bond formation between the PSN material and the surface of the chromatographic column, i.e., consumption of a plurality of scaffolding functionalities in covalent bond formation to the second material.

In accordance with these aspects of the invention, the hybrid materials are prepared using a polymerization sol-gel (PSG) reaction. More particularly, the hybrid materials are prepared using simultaneous polymerization reactions and sol-gel reactions, wherein the organic and inorganic nanophases interconnect by chemical bond formation through an interaction with a hybrid monomer, e.g., by condensation of the inorganic phase, e.g., of the hybrid monomer to an inorganic monomer; and polymerization of the organic phase, e.g., radical polymerization, such that a hybrid material forms. In a particular embodiment, the materials are made from a mixture of a tetraalkoxysilane, tetramethoxysilane, and a polymerizable organosilane, e.g., (3-methacryloxypropyl)trimethoxysilane, wherein the organosilane is minimally water soluble, e.g., sufficient to produce a polymerized scaffolding nanocomposite (i.e., the polymerizable group will have an affect on this solubility).

In one exemplary embodiment, the PSG reaction begins with hydrolysis, e.g., acid catalyzed hydrolysis, e.g., by acetic acid, and slow condensation of a hybrid monomer and an inorganic monomer, e.g., a mixture of tetramethoxysilane and a polymerizable organosilane, such as (3-methacryloxypropyl)trimethoxysilane, and proceeds at low temperature (e.g., a temperature ranging from about 0° C. to about room temperature, e.g. about 20-25° C.) and low pH (e.g., about 2-3), forming a mixture of low molecular weight oligomers. In a subsequent step, a polymerization reaction is initiated, e.g., radically initiated. In certain embodiments, the radical initiation occurs at an increased temperature (e.g., above room temperature, e.g., about 60-65° C.). The oligomers formed are then simultaneously polymerized, e.g., via radical chain polymerization, and further condensed to form a polymerized sol-gel (illustrated in FIG. 1). Moreover, the polymerizable group (depicted in FIG. 1A, in both chemical structure and schematic form) may react with additional polymerizable groups or terminate in a reaction with the surface of a second material, e.g., with an anchoring functionality on the inner surface of a chromatographic column. A simplified example of the product of the polymerization sol-gel reaction is shown in a cross-sectional block of an interior portion of the PSN material in FIGS. 1C and 1D, i.e., polymerization to the second material is not depicted. However, the depictions of FIG. 1 are not intended to limit the scope of the invention.

The PSG reaction is performed at a temperature sufficient to achieve simultaneous polymerization and sol gel reactions, e.g., at 65° C., and is performed for an amount of time sufficient to prepare the hybrid inorganic/organic material, e.g., the PSN material. In certain embodiments, the polymerization is initiated with a radical initiator, e.g., a radical initiator that is minimally water soluble, e.g., 2,2'-azobis(isobutyronitrile), 2,2'-azobis(2-methylpropionamidine)dihydrochloride, 4,4'-azobis(4-cyanovaleric acid), potassium persulfate, or peracetic acid. In certain embodiments of the invention, the sol-gel reaction occurs in the presence of urea.

III. Devices

The porous inorganic/organic hybrid materials of the current invention have a wide variety of end uses in the separation sciences, such as materials for chromatographic columns, thin layer chromatographic (TLC) plates, filtration membranes, microtiter plates, scavenger supports, solid phase organic synthesis supports, Capillary-LC columns, radial compression columns, trap columns, microfluidic devices, microchips, sensors, electronic circuits, miniaturized solid phase extraction (SPE) devices and on-column frits, and the like, having a stationary phase that includes porous inorganic/organic hybrid materials, e.g., monolith materials, of the present invention. The stationary phase may be introduced into the device by coating, impregnation, cladding, wrapping, or other art-recognized techniques consistent with the methods of preparation of the present invention, etc., depending on the requirements of the particular device.

Thus, in another aspect, the invention provides a separations device comprising a) a surface capable of accepting a monolith material comprising a polymerized scaffolding nanocomposite (PSN) material, said surface comprising an anchoring functionality and b) a hybrid inorganic/organic monolith comprising a polymerized scaffolding nanocomposite (PSN), wherein the nanocomposite contains a scaffolding functionality capable of chemically interacting with the anchoring functionality on said surface, and wherein said hybrid organic/inorganic monolith is anchored to said surface by a chemical interaction between said scaffolding functionality and anchoring functionality. In certain embodiments, the devices in accordance with the invention include chromatographic columns, e.g., a glass lined steel column, capillary column, thin layer plates, filtration membranes, sample cleanup devices, and microtiter plates.

In certain embodiments, the separations device is a fused-inorganic capillary column, wherein the inorganic portion may be selected from, but is not limited to silica, alumina, zirconium oxide, titanium oxide, ceramics, tin oxide, and combinations thereof.

In an particularly advantageous embodiment, the invention provides a chromatographic column, e.g., a capillary column, e.g., a fused-silica capillary column, comprising a) a chromatographic column having a cylindrical interior surface capable of accepting a monolith comprising a polymerized scaffolding nanocomposite (PSN) material, the interior surface comprising an anchoring functionality, and b) a hybrid inorganic/organic monolith comprising a polymerized scaffolding nanocomposite (PSN), wherein the nanocomposite contains a scaffolding functionality capable of chemically interacting with the anchoring functionality on the surface, and wherein the hybrid organic/inorganic monolith is anchored to the surface by a chemical interaction between the scaffolding functionality and anchoring functionality.

In certain embodiments, the device is a chromatographic column, e.g., a capillary column, e.g., a fused-silica capillary column, wherein the interior surface of the capillary column is derivatized with a polymerizable anchoring functionality. In certain embodiments of the invention the capillary column has an inner diameter (I.D.) greater than about 50 µm, e.g., greater than about 100 µm, e.g., greater than about 150 µm, e.g., greater than about 200 µm, e.g., greater than about 250 µm, e.g., greater than about 500 µm, e.g., greater than about 1.0 mm, e.g., greater than about 2 mm, e.g., greater than about 3 mm. In a particularly advantageous embodiment, the chromatographic device is a chromatographic column, such as commonly used in HPLC.

EXAMPLES

The present invention may be further illustrated by the following non-limiting examples describing the preparation of porous inorganic/organic hybrid monolith materials, and their use.

Materials

All reagents were used as received unless otherwise noted. Those skilled in the art will recognize that equivalents of the following supplies and suppliers exist, and as such the suppliers listed below are not to be construed as limiting.

Gelest Inc., Morrisville, Pa.: (3-Methacryloxypropyl)trimethoxysilane (MAPTMOS), tetramethoxysilane (TMOS), and octadecyldimethyl(dimethylamino)silane; BASF Corp., Mount Olive, N.J.: Pluronic® F38; Sigma-Aldrich Chemical Co., Milwaukee, Wis.: thiourea, acenaphthene, naphthalene, sodium hydroxide; DuPont, Wilmington, Del., Vazo® 64 and Vazo® 44; J. T. Baker, Phillipsburgh, N.J.: urea, methylene chloride, methanol, acetonitrile, acetone, toluene, pyridine, hydrochloride acid and glacial acetic acid. All solvents were HPLC grade. Water was used directly from a Millipore Milli-Q (Millipore Corp., Bedford, Mass.). Fused silica capillary columns (Cat #FS-115, 150 µm I.D., Cat #FS-150, 50 µm I.D., or equivalents) and all the end-fittings and unions (Cat #P-760) were from Upchurch Scientific (Oak Harbor, Wash.) and from Polymicro Technologies, Phoenix, Ariz. (Cat #TSP 530660, 520 µm I.D., or equivalents). Compression screws were from Waters Corp. (Milford, Mass.).

Example 1

A Harvard Apparatus Model '33' Dual Syringe Pump (Harvard Apparatus Inc., Hollistion, Mass., or equivalent) and 10 mL Pharmaseal® syringe (American Pharmaseals Laboratory, Glendale, Calif., or equivalent) were used in all capillary filling and purging steps.

A fused silica capillary column (ca. 2 m in length) was treated by the following five steps: (1) the column was purged with 1N NaOH at a flow rate of 50 µL/min for at least 5 minutes, sealed via compression fittings and heated to 90° C. for 17 hours; (2) the column was purged with 1N HCl water solution at a flow rate of 50 µL/min for at least 5 minutes; (3) the column was rinsed with water, acetone, and then toluene at a flow rate of 50 µL/min for 10 minutes each (total volume ~500 µL, >10 times column volume); (4) the column was filled with a mixture of 0.5 mL (3-methacryloxypropyl)trimethoxysilane/0.5 mL pyridine/10 mL toluene at a flow rate of 50 µL/min for 5 minutes, sealed at both ends of the column and the column was then heated in a 90° C. oven for 21 hours;

and (5) the column was washed with toluene, acetone and water for 10 minutes each at a flow of 50 µL/min.

After surface derivatization, sections of the 2 meter capillary are cut to make multiple, shorter capillary monoliths that may be used in further experiments.

Example 2

Pluronic® F38 (Example 2a—0.622 g, Example 2b—0.596 g) and urea (Example 2a—0.517 g, Example 2b—0.515 g) were added to 5 mL of a 15 mM acetic acid solution at room temperature in a glass vial. The solutions were deoxygenated by nitrogen gas purging for at least 2 minutes before Vazo® 64 (1-2 mg) was added, and then the solution was cooled to 0° C. In a separate glass vial, a 2 mL silane mixture (4/1 TMOS:MAPTMOS v/v) was prepared and then cooled to 0° C. Next, the silane mixture was added slowly to the acetic acid solution. The combined solutions were stirred at 0° C. for 1 h and then at room temperature (rt) for 1.75 h.

The resulting solutions were delivered into two separate 50 µm (I.D.)×40 mm (L) capillary columns that were surface treated as described in Example 1 with the exception that step (1) was run for 2 hours. The columns were then sealed at both ends with two compression screws and were heated at 45° C. in an oven for 18.5 h.

Monolith morphology of the cross-sections of each column was observed by Scanning Electron Microscopy (SEM) (JEOL, Peabody, Mass. or equivalent) and showed the formation of monolith materials with a majority of macropores with diameters greater than 0.5 µm and the absence of shrinkage away from the capillary wall.

Example 3

As described in Example 2, Pluronic® F38 and urea were added to 5 mL of an acetic acid solution at room temperature. The solutions were deoxygenated by nitrogen gas purging for at least 2 minutes before Vazo® 64 was added. The stirred solutions were cooled to 0° C. for a specific time, and 2 mL of a 0° C. silane mixture (4/1 TMOS:MAPTMOS v/v) was added slowly to the acetic acid solution. The combined solutions were stirred at 0° C. for a prescribed time and then at rt for an additional time period.

The resulting solutions were delivered into separate 150 µm (I.D.)×40 mm (L) capillary columns that had been surface treated as described in Example 1. The columns were then sealed at both ends with two compression screws and were heated at 65° C. for a prescribed time and then at an elevated temperature (Example 3a,b 120° C.; Example 3c-j 105° C.; Example 3k-o 110° C.; Example 3p-t 125° C.) for an additional time period.

Monolith morphology of the cross-sections of each column was observed by SEM as described in Example 2. Depending on the reaction conditions, dense monolith materials (a majority of macropores with diameters less than 0.5 µm) to non-dense monolith materials (a majority of macropores with diameters greater than 0.5 µm) were observed, and varying levels of wall adhesion were achieved. Specific amounts of reagents used to prepare these products and characterization data are listed in Table 1.

Example 3k and 3t were cut to 20 cm lengths and the surfactant was removed from the monolith structure by prolonged methanol purging using an Eldex Micropro Syringe Pump (Eldex, Napa, Calif., or equivalent). The column was purged with methanol for 5 days at a 1.0 µL/min flow rate, at which time no surfactant could be detected in the mobile phase as measured by FTIR spectroscopy (Polaris, Thermo-Mattson, Madison, Wis., or equivalent).

Surface Modification:

After chromatographic evaluation as described in Example 9 (see Table 4), Example 3t was purged with methylene chloride at 1.0 µL/min for 16 h and then purged with a solution of octadecyldimethyl(dimethylamino)silane in methylene chloride (1/4 v/v) at 1 µL/min for 3 h. After surface modification, the column was purged with methylene chloride at 1 µL/min flow rate for 16 hours, which was then exchanged with acetonitrile by purging with greater that 3 column volumes. The resulting surface modified monolith is identified as Example 3u, which was in turn evaluated as described in Example 9 (see Table 4).

Example 4

As described in Example 2, Pluronic® F38 and urea were added to 5 mL of an acetic acid solution at room temperature. The solutions were deoxygenated with $N_2$ purge for at least 2 minutes before Vazo® 64 was added. The stirred solutions were cooled to 0° C. for a specific time, and 2 mL of a 0° C. silane mixture (4/1 TMOS:MAPTMOS v/v) was added slowly to the acetic acid solution. The combined solutions were stirred at rt for prescribed time.

The resulting solutions were delivered into separate 150 µm (I.D.)×40 mm (L) capillary columns that were surface treated as described in Example 1. The columns were then sealed at both ends with two compression screws and were heated at 65° C. for a prescribed time and then at an elevated temperature (4a-e 120° C.; 4f-n 110° C.) for an additional time period.

Monolith morphology on the cross-section of the column was observed by SEM as described in Example 2. Depending on the reaction conditions, dense monolith materials (a majority of macropores with diameters less than 0.5 µm) to non-dense monolith materials (a majority of macropores with diameters greater than 0.5 µm) were observed, and varying levels of wall adhesion were achieved. Specific amounts of reagents used to prepare these products and characterization data are listed in Table 2.

TABLE 1

| Product | HOAc (mM) | Plutonic F38 (g) | Urea (g) | Vazo 64 (mg) | Time 0° C. (min) | Time rt (h) | Time 65° C. (h) | Time elevated temp (h) | Dense (Y/N) | Wall Adhesion (Y/N) |
|---|---|---|---|---|---|---|---|---|---|---|
| 3a | 15 | 0.715 | 0.508 | 5 | 30 | 60 | 15 | 8 | Y | N |
| 3b | 30 | 0.708 | 0.503 | 5 | 30 | 1 | 18 | 7 | Y | Y |
| 3c | 15 | 0.709 | 0.502 | 5 | 0 | 3 | 17 | 5 | Y | Y |
| 3d | 30 | 0.698 | 0.501 | 5 | 0 | 3 | 17 | 5 | Y | N |
| 3e | 15 | 0.797 | 0.509 | 3 | 0 | 3 | 17 | 5 | Y | N |
| 3f | 30 | 0.793 | 0.511 | 3 | 0 | 3 | 17 | 5 | Y | N |

TABLE 1-continued

| Product | HOAc (mM) | Plutonic F38 (g) | Urea (g) | Vazo 64 (mg) | Time 0° C. (min) | Time rt (h) | Time 65° C. (h) | Time elevated temp (h) | Dense (Y/N) | Wall Adhesion (Y/N) |
|---|---|---|---|---|---|---|---|---|---|---|
| 3g | 15 | 0.695 | 0.511 | 5 | 0 | 3 | 17 | 5 | Y | N |
| 3h | 15 | 0.793 | 0.504 | 5 | 0 | 3 | 17 | 5 | Y | N |
| 3i | 15 | 0.593 | 0.511 | 4 | 0 | 4 | 5 | 72 | N | Y |
| 3j | 15 | 0.558 | 0.496 | 4 | 0 | 4 | 5 | 72 | N | Y |
| 3k | 30 | 0.561 | 0.502 | 0.5 | 0 | 3 | 2 | 18 | N | Y |
| 3l | 30 | 0.595 | 0.498 | 1 | 0 | 3 | 2 | 18 | Y | N |
| 3m | 30 | 0.659 | 0.496 | 1 | 0 | 3 | 2 | 18 | Y | N |
| 3n | 30 | 0.703 | 0.497 | 1 | 0 | 3 | 2 | 18 | Y | N |
| 3o | 30 | 0.790 | 0.496 | 1 | 0 | 3 | 2 | 18 | Y | N |
| 3p | 30 | 0.560 | 0.499 | 1 | 0 | 3 | 2 | 16 | N | Y |
| 3q | 30 | 0.533 | 0.508 | 3 | 0 | 3 | 2 | 16 | N | N |
| 3r | 30 | 0.508 | 0.508 | 6 | 0 | 3 | 2 | 16 | N | Y |
| 3s | 30 | 0.470 | 0.513 | 5 | 0 | 3 | 2 | 16 | N | N |
| 3t | 30 | 0.415 | 0.501 | 2 | 0 | 3 | 2 | 16 | N | Y |

TABLE 2

| Product | HOAc (mM) | Pluronic F38 (g) | Urea (g) | Vazo 64 (mg) | Time rt (h) | Time 65° C. (h) | Time elevated temp (h) | Dense (Y/N) | Wall Adhesion (Y/N) |
|---|---|---|---|---|---|---|---|---|---|
| 4a | 50 | 0.605 | 0.484 | 1 | 2 | 4 | 17 | N | Y |
| 4b | 50 | 0.505 | 0.512 | 2 | 2 | 4 | 17 | N | Y |
| 4c | 50 | 0.401 | 0.518 | 2 | 2 | 4 | 17 | N | Y |
| 4d | 50 | 0.704 | 0.500 | 2 | 2 | 4 | 17 | N | N |
| 4e | 50 | 0.358 | 0.495 | 3 | 2 | 4 | 17 | N | Y |
| 4f | 50 | 0.403 | 0.502 | 1 | 2 | 20 | 8 | N | Y |
| 4g | 70 | 0.418 | 0.500 | 1 | 2 | 20 | 8 | N | Y |
| 4h | 100 | 0.400 | 0.492 | 1 | 2 | 20 | 8 | N | N |
| 4i | 50 | 0.404 | 0.493 | 1 | 4 | 3 | 17 | N | N |
| 4j | 70 | 0.419 | 0.492 | 1 | 4 | 3 | 17 | N | N |

TABLE 3

| Product | HOAc (mM) | Pluronic F38 (g) | Urea (g) | Vazo 44 (mg) | Time rt (h) | Time 60° C. (h) | Time 100° C. (h) | Dense (Y/N) | Wall Adhesion (Y/N) |
|---|---|---|---|---|---|---|---|---|---|
| 8a | 50 | 0.694 | 0.486 | 20 | 2 | 17 | 72 | Y | N |
| 8b | 50 | 0.653 | 0.501 | 20 | 2 | 17 | 72 | N | Y |
| 8c | 50 | 0.649 | 0.546 | 2 | 1 | 2 | 17 | Y | N |
| 8d | 50 | 0.659 | 0.514 | 2 | 1 | 2 | 17 | N | Y |
| 8e | 50 | 0.640 | 0.530 | 2 | 1 | 2 | 17 | Y | N |
| 8f | 50 | 0.628 | 0.556 | 2 | 1 | 2 | 17 | Y | N |
| 8g | 50 | 0.674 | 0.553 | 2 | 1 | 2 | 17 | N | Y |

Example 5

Pluronic® F38 (0.424 g) and 0.503 g urea were added to 5 mL of a 15 mM acetic acid solution at room temperature in a glass vial. The solutions were deoxygenated by nitrogen gas purging for at least 2 minutes before 3 mg of Vazo® 64 was added, and then the solution was cooled to 0° C. In a separate glass vial, a 2 mL silane mixture (4/1 TMOS:MAPTMOS v/v) was prepared and then cooled to 0° C. Next, the silane mixture was added slowly to the acetic acid solution. The combined solutions were stirred at 0° C. for 1 h and then at room temperature (rt) for 1.75 h.

The resulting solution was delivered into a fused silica capillary with a length of 40 cm (Examples 5a-b) or 120 cm (Examples 5c-d), and an inner diameter of 150 μm (Examples 5a-c) or 520 μm (Example 5d), which was pretreated as described in Example 1, at a flow rate of 50 μL/min for 5-7 minutes.

The column was then sealed at both ends using compression screws (Examples 5a-b) or Upchurch P760 compression fittings and a single Upchurch P760 union (Examples 5c-d). The sealed column was held at room temperature for two hours after the mixed silanes were added to the acetic acid mixture. The column was then heated in a 65° C. oven for 2 hours, and transferred to a 125° C. oven and held overnight (20 hours).

The column was then slowly cooled to room temperature. The surfactant was removed from the structure by prolonged methanol purging using an Eldex Micropro Syringe Pump (Eldex, Napa, Calif.). The column was purged with methanol for 6 hours at a 0.5 µL/min flow rate, then for 20 hours at 1 µL/min flow rate.

Monolith morphology on the cross-section of the column was observed by SEM as described in Example 2. Non-dense monolith materials (a majority of macropores with diameters greater than 0.5 µm) were observed, and wall adhesion was achieved.

Example 6

The monolith surfaces of columns from Examples 5a-d were surface modified using the following procedure producing surface modified monoliths defined analogously as Examples 6a-d.

A 0.32 M solution of octadecyldimethyl(dimethylamino) silane was prepared in toluene or tetrahydrofuran. The column was purged with this solution using an Eldex Micropro Syringe Pump at a flow rate of 1 µL/min for several column volumes and then heated from 25° C. to 50-55° C. and maintained at 50-55° C. for 19 hours. The column was heated using a Hot Pocket column heater (Thermo Hypersil-Keystone, Bellefonte, Pa., or equivalent). Upon cooling, methanol was purged through the column at 1 µL/min flow rate for at least 5 hours at 35° C.

Example 7

A 1.0 mm I.D.×150 mm L borosilicate glass lined steel column (SGE Inc., Austin, Tex., or equivalent) was surface treated as described in Example 1, with the exception that 6 mL aliquots of solvent was used in step (5). Pluronic® F38 (1.272 g) and urea (1.506 g) were weighed into a glass vial and dissolved into 15.0 mL of a 32 mM acetic acid solution. The mixture was deoxygenated by nitrogen gas purging for 5 minutes before 9 mg of Vazo® 64 were added. The mixture was stirred for 5 minutes at room temperature, and then chilled to 0° C. for 23 min.

Next, 6 mL of silane mixture (4/1 TMOS:MAPTMOS v/v) was slowly added into the above mixture at 0° C. After silane addition, the mixture was stirred at 0° C. for 1.5 h. The resulting mixture was delivered into the glass lined steel column. The column was then sealed at both ends using two Waters stainless steel compression plugs. The sealed column was held at room temperature for two hours after the mixed silanes were added to the acetic acid mixture. The column was heated in a 65° C. oven for 2 hours, and then transferred to a 125° C. oven and held for 18 hours. The column was then slowly cooled to room temperature.

The surfactant was removed from the monolith structure by prolonged methanol purging using a HPLC pump (Model 515, Waters Corp, or equivalent). After methanol purging the column end-fittings and frits were removed. Inspection of the monolith structure yielded no evidence of monolith shrinkage, as observed by optical microscope (Model C-P-S, Nikon, Tokyo, Japan, or equivalent).

Example 8

Solutions of surfactant, urea, and silane in acetic acid were made as described in Example 4, except Vazo® 44 was substituted for Vazo® 64. The resulting solutions were delivered into separate 150 µm I.D.×40 mm L capillary columns that were surface treated as described in Example 1. The columns were sealed, heated, and analyzed as described in Example 4, where the elevated temperature was 110° C. The specific amounts of reagents used to prepare these products and the resulting characterization data are listed in Table 3.

Example 9

Pressure data on monolith columns were collected on non-surface modified and surface modified monoliths using the pressure transducer of an Eldex MicroPro Syringe Pump (Eldex, Napa, Calif., or equivalent). An equivalent particle diameter (apparent particle size) was obtained based on the Kozeny-Carman equation. An interstitial porosity of 0.4 of the particle packed column that would give the same permeability as the monolith bed was assumed. Solvent viscosities of solvent mixtures were obtained based on the data of Colin et. al. [H. Colin, J. C. Diez-Masa, G. Guiochon, T. Czajkowska, I. Miedziak, J. Chromatogr., 167 (1978) 41-65]. Solvent viscosities of neat solvents were obtained from Handbook of Chemistry and Physics on CD-ROM (version 2002, Editor-in-chief D. R. Lide, Chapman & Hall/CRC).

Results of the determination of the equivalent particle size are summarized in Table 4.

TABLE 4

Equivalent Particle Size [µm] in Selected Solvents

| Product | Methanol | Methylene Chloride | Acetonitrile | Acetonitrile-water 55:45 (v/v) | Acetonitrile-water 40:60 (v/v) |
|---|---|---|---|---|---|
| 3t | 3 | 4 | — | 4 | — |
| 3u | — | 3 | 4 | 3 | 3 |
| 5b | 4 | — | — | — | — |
| 6b | — | — | — | — | 4 |
| 5c | 21 | — | — | — | — |
| 6c | — | — | — | — | 17 |
| 5d | — | — | — | 26 | — |
| 6d | — | — | — | — | 26 |

Example 10

The following example demonstrates the porosity of the hybrid inorganic/organic materials and further characterizes the materials using chromatographic criteria, i.e., efficiency and tailing factor.

Experimental Conditions:

The experimental data was acquired using an Eldex Micro-Pro Syringe Pump (Eldex, Napa, Calif., or equivalent), a Valco internal sample injector (Valco Instruments Co. Inc., Houston, Tex., or equivalent) and a Waters 2487 Dual λ absorbance detector equipped with a 250 nL capillary flow cell (Waters Corp., or equivalent). Data acquisition and determination of chromatography parameters was performed using Millenium 32 software (Waters Corp., or equivalent). Acetonitrile and water was mixed in 40/60 volume ratio. Thiourea, naphthalene and acenaphthene were used as analytes. The pump was operated at volumetric flow rates between 0.25 and 4.0 µL/min. Thiourea, naphthalene and acenaphthene were dissolved in acetonitrile-water 55:45 (v/v) mixture at 20, 100 and 400 µg/ml respectively. The injection volume was 20 nL. UV detection was carried out at 254 nm. The experiments were performed at ambient temperature (24° C.).

Experimental Protocol:

The columns were directly connected to the injector and to the inlet of capillary flow cell except 3u which was connected with 50 µm I.D. fused silica capillaries. Results of chromatography evaluation are summarized in Table 5. Total porosity was calculated by dividing the elution volume of non-retained compound (thiourea) by the total column volume.

TABLE 5

| Column No. | Flow Rate [μL/min] | Test Solute | Capacity Factor | N/meter (half width) | USP Tailing Factor | Total Porosity |
|---|---|---|---|---|---|---|
| 3u | 0.25 | Naphthalene | 3.76 | 12540 | 1.27 | 0.96 |
|  | 0.5 | Naphthalene | 3.47 | 11890 | 1.40 |  |
|  | 0.75 | Naphthalene | 3.38 | 980 | 1.42 |  |
|  | 0.25 | Acenaphthene | 7.79 | 17550 | 1.21 |  |
|  | 0.5 | Acenaphthene | 7.24 | 14450 | 1.32 |  |
|  | 0.75 | Acenaphthene | 7.06 | 12660 | 1.33 |  |
| 6b | 0.25 | Naphthalene | 4.55 | 42123 | 1.46 | 0.97 |
|  | 0.5 | Naphthalene | 4.69 | 45205 | 1.42 |  |
|  | 0.75 | Naphthalene | 4.61 | 41095 | 1.36 |  |
|  | 1.0 | Naphthalene | 4.62 | 36986 | 1.34 |  |
|  | 0.25 | Acenaphthene | 9.88 | 49315 | 1.20 |  |
|  | 0.5 | Acenaphthene | 10.18 | 52053 | 1.29 |  |
|  | 0.75 | Acenaphthene | 9.88 | 45204 | 1.27 |  |
|  | 1.0 | Acenaphthene | 9.91 | 39042 | 1.25 |  |
| 6c | 0.25 | Naphthalene | 5.2 | 40650 | 1.24 | 0.92 |
|  | 0.5 | Naphthalene | 5.2 | 48260 | 1.28 |  |
|  | 1.0 | Naphthalene | 4.9 | 43700 | 1.24 |  |
|  | 2.0 | Naphthalene | 5.0 | 30270 | 1.17 |  |
|  | 4.0 | Naphthalene | 5.2 | 19207 | 1.14 |  |
|  | 0.25 | Acenaphthene | 11.44 | 56267 | 1.26 |  |
|  | 0.5 | Acenaphthene | 11.4 | 63878 | 1.28 |  |
|  | 1.0 | Acenaphthene | 11.0 | 45397 | 1.23 |  |
|  | 2.0 | Acenaphthene | 11.0 | 29550 | 1.16 |  |
|  | 4.0 | Acenaphthene | 11.4 | 19593 | 1.14 |  |

REFERENCES

[1] MacNair J. E., etc. *Anal Chem.* 1999, 71, 700
[2] Svec F., etc. Review *J. Chromatography A,* 2000, 887, 3-29
[3] Nakanishi K., Tanaka N. etc., *J. High Resol. Chromatogr.* 1998, Vol. 21, No. 8 p 477-479; Nakanishi K., Tanaka N. etc., *J Chromatography A* 2002, 960, 85-96
[4] Nakanishi K., Tanaka N. etc., *J. Chromatography A* 2002, 961, 53-63
[5] Zare R. N. etc., *Anal. Chem.* 2001, 73, 3921-3926
[6] Zare R. N. etc. *J. Chromatography A,* 2002, 961, 45-51.
[7] Zare R. N. etc. US Patent Application 2002/0079257
[8] Nakanishi K. etc. WO 99/50654
[9] O. Prucker and J. Rühe, Macromolecules 1998, 31, 592-601
[10] O. Prucker and J. Rühe, Macromolecules 1998, 31, 602-613
[11] Hanson et al., *J. Chromat.* A656 (1993) 369-380

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. The contents of all references, issued patents, and published patent applications cited throughout this application are hereby incorporated by reference.

What is claimed is:

1. A hybrid inorganic/organic monolith utilized in chromatographic separation comprising a polymerized scaffolding nanocomposite (PSN), wherein the nanocomposite contains a scaffolding functionality which chemically interacts with an anchoring functionality on an internal surface of a chromatographic device; and wherein the hybrid inorganic/organic monolith is prepared by a method comprising the steps of
    a) forming a sol-gel by the reaction of two or more monomers within the chromatographic device;
    b) initiating a polymerization reaction; and
    c) allowing the monomers to react through a polymerization sol-gel (PSG) reaction, thereby preparing the hybrid inorganic/organic monolith;
wherein
the pore structure of said hybrid inorganic/organic monolith is modified by including a surfactant or combination of different surfactants in said PSG reaction and wherein the surfactant is removed from the monolith structure following said PSG reaction,
and wherein the internal surface of the chromatotgraphic device is derivatized with the anchoring functionality and the monolith structure shows no optical evidence of shrinkage, as observed by optical microscope.

2. The hybrid monolith of claim 1, wherein the chromatotgraphic device is a containment vessel, a column, a capillary column, or a microfluidic channel having at least one surface.

3. The hybrid monolith of claim 1, wherein the scaffolding functionality is selected from the group consisting of vinyl, acrylate, methacrylate, acrylamide, methacrylamide, styrene, divinylbenzene, itaconate, fumarate, alkyne, and combinations thereof.

4. The hybrid monolith of claim 1, wherein the surface of the chromatotgraphic device is derivatized with an anchoring functionality.

5. The hybrid monolith of claim 4, wherein the anchoring functionality is selected from the group consisting of vinyl, acrylate, methacrylate, acrylamide, methacrylamide, styrene, divinylbenzene, itaconate, fumarate, alkyne, azo compounds, and combinations thereof.

6. The hybrid monolith of claim 4, wherein the scaffolding functionality and the anchoring functionality are copolymerizable.

7. The hybrid monolith of claim 2, wherein containment vessel is selected from the group consisting of a capillary column, a glass lined steel column, a radial compression column, a trap column, a microfluidic device, a microchip, a sensor, an electronic circuit, a miniaturized SPE device, and an on-column frit.

8. The hybrid monolith of claim 2, where the containment vessel is a fused silica capillary column.

9. The hybrid monolith of claim 1, wherein chemical interaction is formation of a covalent bond.

10. The hybrid monolith of claim 9, wherein the covalent bond is formed by polymerization.

11. The hybrid monolith of claim 10, wherein the polymerization is initiated with a radical initiator.

12. The hybrid monolith of claim 11, wherein the radical initiator is minimally water soluble.

13. The hybrid monolith of claim 11, wherein the initiator is selected from the group consisting of 2,2'-azobis(isobutyronitrile), 2,2'-azobis(2-methylpropionamidine)dihydrochloride, 4,4'-azobis(4-cyanovaleric acid), potassium persulfate, and peracetic acid.

14. The hybrid monolith of claim 1, wherein the inorganic portion of the hybrid material is a material selected from the group consisting of alumina, silica, titanium oxide, zirconium oxide, and ceramic material.

15. The hybrid monolith of claim 1, wherein the inorganic portion of the hybrid material is silica.

16. The hybrid monolith of claim 1, wherein the PSN is the product of a reaction of an organosilane and an inorganic silane monomer.

17. The hybrid monolith of claim 16, wherein the PSN is the product of a reaction of a tetraalkoxysilane and an organosilane containing at least one polymerizable group.

18. The hybrid monolith of claim 17, wherein said tetraalkoxysilane has the formula $Si(OR^1)_4$, where $R^1$ is a $C_1$-$C_3$ alkyl moiety.

19. The hybrid monolith of claim 17, wherein said organosilane is an organoalkoxysilane having the formula $R^2Si(OR^1)_3$ or $R^6[Si(OR^1)_3]_m$ where $R^2$ is a styryl, vinyl, an acrylate, methacrylate, acrylamide, methacrylamide, divinylbenzene, itaconate, fumarate, substituted or unsubstituted $C_1$-$C_{18}$ alkenylene, alkynylene or arylene, or a combination thereof; $R^1$ is a $C_1$-$C_4$ alkyl moiety; $R^6$ is a substituted or unsubstituted $C_1$-$C_{18}$ alkenylene, alkynylene or arylene moiety bridging two or more silicon atoms; and m is an integer greater than or equal to two.

20. The hybrid monolith of claim 19 wherein $R^2$ is vinyl, methacryloxypropyl, methacrylamidepropyl, or styrylethyl and $R^1$ is methyl or ethyl; or $R^6$ is a bridging N,N-bis(propylene) acrylamide group, m=2, and $R^1$ is ethyl or methyl.

21. The hybrid monolith of claim 16, wherein the organosilane is minimally water soluble.

22. The hybrid monolith of claim 16 wherein said tetraalkoxysilane is selected from the group consisting of tetramethoxysilane and tetraethoxysilane.

23. The hybrid monolith of claim 16, wherein the tetraalkoxysilane is tetramethoxysilane.

24. The hybrid monolith of claim 16, wherein the polymerizable group is 3-methacryloxypropyl.

25. The hybrid monolith of claim 16, wherein the polymerizable group is styrylethyl.

26. The hybrid monolith of claim 16, wherein the tetraalkoxysilane is minimally water soluble.

27. The hybrid monolith of claim 16, wherein the organosilane is (3-methacryloxypropyl)trimethoxysilane.

28. The hybrid monolith of claim 1, wherein the pore structure of said hybrid material is modified by further subjecting said material to hydrothermal treatment.

29. The hybrid monolith of claim 1, wherein said surfactant or combination of surfactants are nonionic surfactants.

30. The hybrid monolith of claim 29, wherein the surfactants are selected from the group consisting of surfactants comprised of block copolymers of polyethylene glycol and polypropyleneglycol, surfactants comprised of alkylphenoxypolyethoxyethanol, and polyethyleneglycol.

31. The hybrid monolith of claim 29, wherein the surfactant is polyoxyethylene-polyoxypropylene block copolymer.

32. The hybrid monolith of claim 28, wherein said surfactant or combination of surfactants are selected from surfactants with a hydrophile-lipophile balance ranging from about 0 to 60.

33. The hybrid monolith of claim 28, wherein said surfactant or combination of surfactants are selected from surfactants with a hydrophile-lipophile balance ranging from about 10 to 50.

34. The hybrid monolith of claim 28, wherein said surfactant or combination of surfactants are selected from surfactants with a hydrophile-lipophile balance ranging from about 20 to 40.

35. The hybrid monolith of claim 28, wherein said surfactant or combination of surfactants are selected from surfactants with a hydrophile-lipophile balance ranging from about 30 to 40.

36. The hybrid monolith of claim 28, wherein said surfactant or combination of surfactants are selected from surfactants with a hydrophile-lipophile balance of about 33.

37. The hybrid monolith of claim 1, wherein said monolith has been surface modified by a surface modifier selected from the group consisting of an organic group surface modifier, a silanol group surface modifier, a polymeric coating surface modifier, and combinations thereof.

38. The hybrid monolith of claim 37, wherein said monolith has been surface modified by a polymeric coating surface modifier.

39. The hybrid monolith of claim 37, wherein said monolith has been surface modified by a combination of an organic group surface modifier and a silanol group surface modifier.

40. The hybrid monolith of claim 37, wherein said monolith has been surface modified by a combination of an organic group surface modifier and a polymeric coating surface modifier.

41. The hybrid monolith of claim 37, wherein said monolith has been surface modified by a combination of a silanol group surface modifier and a polymeric coating surface modifier.

42. The hybrid monolith of claim 37, wherein said monolith has been surface modified by a combination of an organic group surface modifier, a silanol group surface modifier, and a polymeric coating surface modifier.

43. The hybrid monolith of claim 37, wherein said monolith has been surface modified by a silanol group surface modifier.

44. The hybrid monolith of claim 37, wherein said monolith has been surface modified via formation of an organic covalent bond between an organic group of the material and a surface modifier.

45. The hybrid monolith of claim 37, wherein the surface modifier has the formula $Z_a(R')_b Si-R$, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

46. The hybrid monolith of claim 45 wherein R' is selected from the group consisting of methyl, ethyl, propyl, isopropyl, butyl, t-butyl, sec-butyl, pentyl, isopentyl, hexyl and cyclohexyl.

47. The hybrid monolith of claim 45 wherein said functionalizing group R is a $C_1$-$C_{30}$ alkyl group.

48. The hybrid monolith of claim 45 wherein said functionalizing group R is a $C_1$-$C_{20}$ alkyl group.

49. The hybrid monolith of claim 45 wherein said surface modifier is selected from the group consisting of octyltrichlorosilane, octadecyltrichlorosilane, octadecyldimethyl-N,N-dimethylaminosilane, octyldimethylchlorosilane, and octadecyldimethylchlorosilane.

50. The hybrid monolith of claim 45, wherein said surface modifier is octadecyldimethyl-N,N-dimethylaminosilane.

51. The hybrid monolith of claim 45, wherein said functionalizing group R is selected from the group consisting of alkyl, alkenyl, alkynyl, aryl, cyano, amino, diol, nitro, ester, a cation or anion exchange group, an alkyl group containing an embedded polar functionality and an aryl group containing an embedded polar functionality.

52. The hybrid monolith of claim 2, wherein the chromatotgraphic device has an internal surface and an external surface.

53. A method of in situ preparation of a hybrid inorganic/organic monolith in a fused-silica capillary column, said method comprising:

forming an anchoring functionality on an interior surface of said capillary column; and forming inside said capillary column a hybrid inorganic/organic monolith comprising a polymerized scaffolding nanocomposite (PSN), wherein the nanocomposite contains a scaffolding functionality capable of chemically interacting with the anchoring functionality on said surface, said monolith being formed by:

a) forming a sol-gel by the reaction of two or more monomers;
b) initiating a polymerization reaction; and
c) allowing the monomers to react through a polymerization sol-gel (PSG) reaction;

whereby said scaffolding functionality and said anchoring functionality chemically interact to thereby anchor said monolith to said surface, such that a hybrid inorganic/organic monolith is prepared in situ in the fused-silica capillary column.

54. The method of claim 53 further comprising modifying the pore structure of the monolith.

* * * * *